United States Patent [19]

Vaz et al.

[11] Patent Number: 4,728,547

[45] Date of Patent: Mar. 1, 1988

[54] LIQUID CRYSTAL DROPLETS DISPERSED IN THIN FILMS OF UV-CURABLE POLYMERS

[75] Inventors: Nuno A. Vaz, West Bloomfield; George W. Smith, Birmingham, both of Mich.

[73] Assignee: General Motors Corporation, Detroit, Mich.

[21] Appl. No.: 933,212

[22] Filed: Nov. 21, 1986

Related U.S. Application Data

[63] Continuation-in-part of Ser. No. 742,983, Jun. 10, 1985, abandoned.

[51] Int. Cl.$^4$ .................. B05D 3/06; C09K 19/00
[52] U.S. Cl. ..................... 428/1; 128/736; 252/299.66; 350/331 R; 350/351; 427/54.1
[58] Field of Search .............. 427/54.1; 428/1; 128/736; 350/331 R, 351; 252/299.66

[56] References Cited

U.S. PATENT DOCUMENTS

| | | | |
|---|---|---|---|
| 3,578,844 | 5/1971 | Churchill et al. | 350/351 |
| 3,600,060 | 8/1971 | Churchill et al. | 350/331 R |
| 3,720,623 | 3/1973 | Cartmell et al. | 428/402.2 |
| 3,734,597 | 5/1973 | Churchill et al. | 350/351 |
| 3,787,303 | 1/1974 | Guthrie et al. | 427/54.1 |
| 3,816,786 | 6/1974 | Churchill et al. | 350/351 X |
| 3,855,093 | 12/1974 | Guthrie et al. | 427/54.1 |
| 3,872,050 | 3/1975 | Benton et al. | 428/1 X |
| 3,908,039 | 9/1975 | Guthrie et al. | 427/54.1 |
| 3,935,337 | 1/1976 | Taylor | 252/299.66 X |
| 4,030,812 | 6/1977 | Strebel | 350/406 |
| 4,091,122 | 5/1978 | Davis et al. | 427/151 X |
| 4,147,651 | 4/1979 | Oh | 252/299.66 X |
| 4,182,700 | 1/1980 | Benton et al. | 524/871 |
| 4,388,139 | 6/1983 | Fuller | 350/351 X |
| 4,435,047 | 3/1984 | Fergason | 350/334 |
| 4,688,900 | 8/1987 | Doane et al. | 350/347 V |

FOREIGN PATENT DOCUMENTS

| | | |
|---|---|---|
| 0119867 | 8/1984 | European Pat. Off. |
| 1908118 | 11/1971 | Fed. Rep. of Germany |
| 1698092 | 2/1974 | Fed. Rep. of Germany |
| 178428 | 10/1984 | Japan |
| 226322 | 12/1984 | Japan |
| WO85/04262 | 9/1985 | PCT Int'l Appl. |

OTHER PUBLICATIONS

Fergason: "Polymer Encapsulated Nematic Liquid Crystals for Display and Light Control Applications", *SID 85 Digest*, (1985), pp. 68–70.

*Primary Examiner*—Richard D. Lovering
*Attorney, Agent, or Firm*—George A. Grove

[57] ABSTRACT

Optically responsive films comprising birefringent nematic and/or birefringent chiral nematic liquid crystal microdroplets dispersed in UV-cured polymeric reaction products of di- and/or triallyl ethers and esters and suitable polythiols are disclosed.

4 Claims, 2 Drawing Figures

LIQUID CRYSTAL DROPLETS DISPERSED IN THIN FILMS OF UV-CURABLE POLYMERS

This is a continuation-in-part of co-pending application Ser. No. 742,983 filed June 10, 1985, now abandoned.

This invention relates to optical films incorporating birefringent nematic and chiral nematic liquid crystal materials. More specifically, this invention relates to thin optically responsive films of ultraviolet radiation (UV) cured polymers incorporating a dispersion of microdroplets of such liquid crystal materials.

As liquid crystal devices find wider application, there is motivation to develop new and easier ways to make or use packages of these special materials. It is now known that some liquid crystal materials and certain liquid epoxy polymer precursors can be mixed together, the liquid mixture cast into a film, and the epoxy precursor materials allowed to react and cure. The product is an epoxy film that contains dispersed therein, or encapsulated therein, many very small drops of liquid crystal material. Depending upon the nature of the liquid crystal material and the temperature of the film, the film may be opaque at room temperature. However, when the film is heated or subjected to an electrical or magnetic field across its thickness, the treated portions of the film may become transparent.

Dispersion of liquid crystal material in a cured epoxy polymer matrix film is a convenient package for working with the liquid crystals. However, the making of the epoxy films is subject to several disadvantages. The epoxy precursors must be handled in two parts to avoid premature curing. Commonly used liquid crystal materials usually cannot tolerate high temperature. The epoxy precursors must be chosen to be curable at about room temperature. Once all ingredients are mixed, the cure starts. The cure is relatively slow which leads to handling problems and aging problems in the epoxy film.

Accordingly, it is an object of the present invention to provide a practice for making thin films of dispersed liquid crystal materials utilizing certain specific UV-curable polymeric precursor materials. We find that one-part mixtures of such precursors with suitable birefringent nematic and/or birefringent chiral nematic type liquid crystals have good shelf life and yet can be conveniently rapidly cured by exposure of a film of the mixture to intense UV radiation. The resultant films may be employed in optical display devices that can be switched electrically or magnetically (and thermally, if desired).

It is another object of the present invention to provide a method to rapidly prepare a UV-cured polymer film of dispersed liquid crystal materials that may be formed between flat glass or plastic optical plates or upon another suitable substrate. The resultant film may be free standing or supported by one or two substrates, at least one of which is optically clear. The film can be made in any size or shape and is flexible and yet durable and has particular utility as an optical display material.

It is still another object of our invention to provide a method of making a polymer film containing droplets of suitable nematic or chiral nematic type liquid crystals such that the film is opaque in one mode of operation and transparent in another mode. Such film can be switched from opaque to transparent by application of an electric or magnetic field.

It is another object of our invention to provide a method of making a liquid crystal containing polymer film employing polymer materials that can be formed by premixing liquid materials and later, at a time of choice, rapidly and substantially completely cured with high intensity UV radiation at room temperature or other desired temperature to minimize handling problems as well as degradation or other side reactions with the dispersed liquid crystal material.

It is a more specific object of our invention to provide a UV-cured film which is the reaction product of suitable specific precursor materials and that are compatible with entrained microdroplets of birefringent nematic (and/or chiral nematic) phase liquid crystal materials.

BRIEF SUMMARY OF THE INVENTION

In accordance with a preferred embodiment of our invention, these and other objects and advantages are illustrated as follows. A liquid mixture of polymer precursors comprising triallyl isocyanurate, pentaerythritol tetrakis(3-mercapto-propionate), and benzophenone is prepared in the molar proportions of approximately 55:41:4. A small volume of these polymer precursors is mixed with a slightly smaller volume of a commonly known biphenyl type liquid crystal material that displays the nematic mesophase. The mixing was accomplished by hand stirring. The liquid mixture may be allowed to stand as long as desired before cure is initiated. Then the liquid mixture is spread between two thin glass plates and exposed to high intensity ultraviolet radiation. The polymer precursors react quickly, in a matter of seconds, to form a cured polymeric matrix while liquid crystal microdroplets separate from the mixture.

The polymer portion of the resulting two-phase film is substantially transparent to visible light at room temperature. It has an index of refraction suitably matching that of the isotropic phase of the biphenyl type liquid crystal material as well as the ordinary index of refraction of the material when it is in its mesophase. The liquid crystal material is dispersed as extremely small droplets, of the order of a few tenths of a micron in diameter, in the polymer matrix. If a liquid crystal composition has been selected that is in its mesophase at room temperature, the film will be milky white opaque due to light scattering when prepared as described above provided that the ordinary and extraordinary indices of refraction of the nematic liquid crystal are sufficiently different from each other. However, if the film is heated to a temperature above that at which the material becomes an isotropic liquid, the composite film becomes transparent. The film may also be made to undergo transition from opaque to transparent by subjecting it to a relatively low electrical potential, either a DC potential or a relatively low frequency alternating current potential or even a magnetic field. In each of these cases respectively, the liquid crystal should have positive dielectric anisotropy and positive diamagnetic anisotropy.

A fundamental aspect of our invention is the discovery of a suitable UV-curable polymeric precursor family in which compatible liquid crystal material may be dispersed as microdroplets. Different types of liquid crystal materials may be employed in the practice of our invention. Such materials displaying birefringent nematic and chiral nematic mesophases have been successfully used. However, the choices of liquid crystal and polymer are of great importance in determining both the electro-optic performace and environmental durability of the film.

Suitable UV-curable polymers are based on the reaction product of triallyl isocyanurate, and/or other suitable di- and tri-allyl ethers or esters, and one or more suitable polythiols selected from the group consisting of $Z[OCO(CH_2)_nSH]_m$, where $Z$=a polyvalent organic moiety which is the $CH_{0-3}$ group containing nucleus of a tri- or tetravalent alcohol such as glycerol, trimethylolpropane or pentaerythritol, $m=3$ or 4, and $n=1$ to 5. Pentaerythritol tetrakis(3-mercapto-propionate) is particularly suitable and preferred. The proportions of the triallyl isocyanurate and the polythiol are selected as to be substantially chemically equivalent so as to produce a relatively high molecular weight polymer. A suitable photoinitiator is employed. Benzophenone is preferred for this purpose.

Other objects and advantages of our invention will become more apparent from a detailed description thereof which follows. Reference will be made to the drawings in which:

DETAILED DESCRIPTION OF SPECIFIC EMBODIMENTS

A few specific examples will further illustrate the practice of our invention.

EXAMPLE 1

We employed a commercially available optical adhesive material as the UV-curable polymeric precursor composition. The material consisted of about 55 mole percent triallyl isocyanurate, 41 mole percent pentaerythritol tetrakis(3-mercapto-propionate), and 4 mole percent benzophenone. As a liquid crystal mixture, we employed mixture E8 supplied by E M Chemicals, Hawthorne, NY. That mixture of nematic materials consisted of by weight 4'n-pentyl-4-cyanobiphenyl (5CB), 43 percent; 4'-n-propoxy-4-cyanobiphenyl (3OCB), 17 percent; 4'-n-pentoxy-4-cyanobiphenyl (5OCB), 13 percent; 4'-n-octyloxy-4-cyanobiphenyl (8OCB), 17 percent; and 4'-n-pentyl-4-cyanoterphenyl (5CT), 10 percent. Seventy-five parts by volume of the polymer precursor mixture were mixed with 50 parts by volume of the liquid crystal mixture using a spatula. Several glass slide sandwiches were prepared as follows. A small portion of the mixture was placed on a thin flat rectangular glass plate. A few silica microspheres, about 20 microns in diameter, were sprinkled on the plate to serve as spacers between the glass plates. The glass plate had a thin conductive layer of indium-tin oxide on the surface to which the liquid crystal mixture was applied. A like glass plate was laid over the mixture and spacers and pressed down to form a thin film about 20 microns thick.

The mixture in each slide assembly was then cured under a UV lamp (Fusion Systems Corporation, Rockville, Maryland) having a 300 Watt/inch bulb. The slide assemblies were passed under the lamp at a distance of 3-4 inches on a belt at a speed of ten feet per minute using several of the prepared films. It was determined that three passages, or a total exposure time of about six seconds, was adequate to achieve a suitable cure.

It will be recognized that the commercially available mixture E8 of liquid crystal material is a mixture capable of displaying a birefringent nematic mesophase at about normal room temperature. The films that we prepared by the above-described practice were milky white opaque at room temperature. However, when the films were heated to the nematic-isotropic phase transition temperature near 80° C., they abruptly became clear and transparent. Our films remained clear at temperatures above about 80° C. but returned to a milky opaque condition when cooled below that temperature.

When we connected the two glass slides containing thin transparent conductive electrodes to an electrical source and applied 100 volts, 60 cycle AC, the opaque films again became clear and transparent. When the voltage was removed, the films again virtually instantaneously became opaque.

Figure 1:
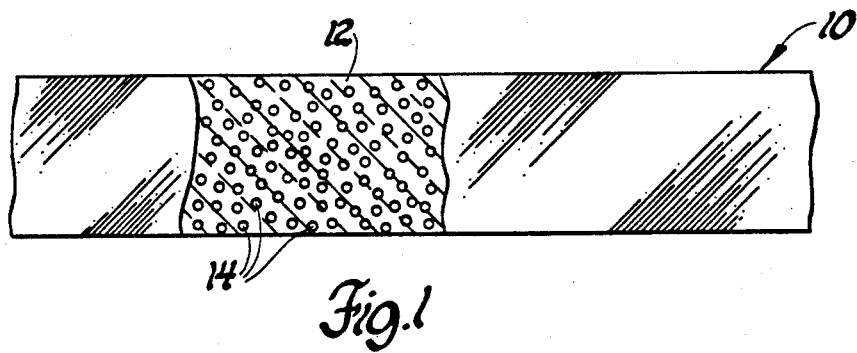
FIG. 1 is a schematic view in cross section and greatly enlarged of a liquid crystal-containing film of this invention.
Figure 2:
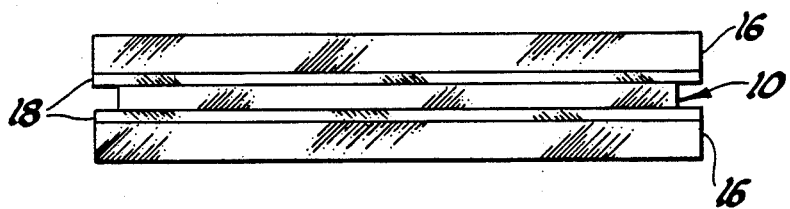
FIG. 2 is a schematic view in enlarged cross section of the film disposed between two transparent plates.

Thus we had produced a useful, extremely rapidly curable film of dispersed liquid crystal microdroplets. The film is represented schematically (greatly enlarged) in FIG. 1 at 10. It comprises a UV-cured polymer matrix 12 containing a dispersion of many liquid crystal microdroplets 14. FIG. 2 illustrates the film 10 between two glass plates 16. Each plate bears a transparent conductive coating 18 lying against film 10. The film is opaque at room temperature but could readily be converted to a transparent film by the application of heat or of a suitable electrical potential. Clearly by adjusting the indices of refraction of the polymer and the liquid crystal via dissolving suitable materials, one can optimize the temperature driven effects or the electric or magnetic driven effects. Obviously such a film could be adapted as a display, a light shutter or a temperature sensing device.

EXAMPLE 2

We prepared another set of films using 75 parts by volume of the same polymer precursor mixture and 50 parts by volume of a single substantially pure liquid crystal material, 4-n-heptyl-4'-cyanobiphenyl (7CB). The two liquids were mixed together by hand using a spatula and a film formed between glass plates having transparent conductive electrodes as described above. The film was milky opaque at room temperature but quickly became clear and transparent when heated to a temperature of about 45° C. Upon cooling below that temperature, the film again became opaque. This practice could be repeated indefinitely.

As with the liquid crystal mixture of Example 1, the films of this example could also be converted from opaque to transparent by the application of an electrical potential of 50 volts rms across the 20 micron thick film. The transparent film became opaque again when the electrical potential was removed.

Additional films that operated in substantially the same way as the above-described films were prepared using the above UV-curable polymer precursor mixture and p-cyanophenyl-p-pentylbenzoate. Likewise, similar films were made using p-cyanophenyltrans-4-pentylcyclohexanecarboxylate.

EXAMPLE 3

Films like the first set of films of Example 2 were prepared between two flat slabs of plexiglas. These films could be easily separated from the slabs as free standing films of a few mils in thickness. This method provides free standing films that are flexible and tough and can be adapted for use as temperature sensors or light shutters to be easily made or cut to any size, shape or configuration. Clearly any other of the films described in Examples 1 and 2 could be prepared the same way.

Thus, we have developed a family of liquid crystal films in which microdroplets of liquid crystal materials are dispersed in a UV-cured polymer based on suitable di- or triallyl ethers or esters and suitable polythiols. We have found that these films are particularly useful when employing birefringent nematic and/or chiral nematic liquid crystal materials. Where it is desired to color the films, suitable dyes may be incorporated therein.

Birefringent nematic and birefringent chiral nematic liquid crystals or mixtures suitable for use in the practice of our invention display positive dielectric anisotropy and/or positive diamagnetic anisotropy in the UV-cured polymer matrix. Such liquid crystal materials have elongated molecules. The long direction of the molecule is considered to be its optic axis. A body of aligned molecules of such liquid crystal material in its mesophase displays an ordinary index of refraction, $n_o$, perpendicular to the optic axes of its molecules and an extraordinary index of refraction, $n_e$, parallel to the optic axes. In the practice of our invention, the values of $n_e$ and $n_o$ must be suitably different from each other (such that the material is birefringent) and $n_o$ should be close in value (e.g. $\pm 0.02$) to the index of refraction of the polymer matrix. In this regard, the chiral nematic cholesteryl esters are not suitable because they are not sufficiently birefringent.

A dispersion of suitable mesophase liquid crystal material as non aligned microdroplets, suitably about 0.1 to 10 microns in diameter and preferably about 0.5 to 1 micron in diameter, in a film of UV-cured polymer will be opaque. Light incident upon the transparent polymer matrix will encounter many dispersed microspheres that have a different effective index of refraction than the matrix. Because of the mismatch of indices of refraction of the optically transparent (to visible light) matrix and transparent microdroplets, an observer of the film perceives it as opaque.

However, when a suitable electric field (preferably an AC field) or magnetic field is applied to the opaque film, it becomes transparent almost instantly. The mesophase molecules respond to the field by aligning themselves lengthwise with it. The effective index of refraction, $n_o$, of the molecularly aligned microdroplets is sufficiently close to that of the matrix polymer such that the regions of the film exposed to the field are transparent. A major advantage of our films is that they are readily made, durable, resistant to aging and switchable electrically from opaque to transparent and back. Obviously, such films may be adapted for uses as information displays, light shutters and the like.

In another aspect of our invention, our films may be switched thermally. As previously stated, when the index of refraction of the liquid crystal in its isotropic phase is sufficiently close in value to the index of refraction of the polyer matrix, the film is transparent. Thus, the film can be repeatedly changed from opaque to transparent and back by suitable heating and cooling. In this mode of operation, the film can be employed to sense temperature changes.

In general, birefringent nematic and chiral nematic liquid crystals are suitable for use in our UV-cured polymer films. Of course, the combination of specific liquid crystal material or mixture must be evaluated for compatibility with the specific polymer employed. Examples of suitable liquid crystals include alkyl and alkoxy biphenyls and terphenyls, alkyl benzoate cyanophenyls and cyanophenyl pyrimidines. Specific examples are the mixtures of cyanobiphenyls and terphenyls used in Examples 1 and 2, p-cyanophenyl-p-n-alkylbenzoate, 5-n-alkyl-2-(4-cyanophenyl)-pyrimidine, 5-(4-n-butylphenyl)-2-(4-cyanophenyl)-pyrimidine, and 5-trans-(4-ethyl cyclohexyl)-2-(4-cyanophenyl)-pyrimidine. An example of a suitable high birefringence chiral nematic material is (+) 4-cyano-4'-(2 methol) butylbiphenyl.

As indicated above, the polythiol component of the UV-curable polymer precursor mixture is suitably a composition taken from the group consisting of $Z[OCO(CH_2)_nSH]_m$, where $Z$ = a polyvalent organic moiety which is the $CH_{0-3}$ group containing nucleus of a tri- or tetravalent alcohol such as glycerol, trimethylolpropane or pentaerythritol, $m = 3$ or 4, and $n = 1$ to 5.

Examples of suitable polythiol components include trimethylolpropane tri-(3-mercaptopropionate) and pentaerythritol tetrakis (3-mercaptopropionate). Examples of suitable di- or triallyl (allyl is the $-CH_2-CH=CH_2$ group) ethers or esters include triallyl isocyanurate [also named triallyl-1,3,5-triazine-2,4,6(H,3H,5H)-trione], cyclohexane [1,3,3-trimethyl-1-amino-methyl-2-propeneylate-5-amino-2,2-bis [(2-propenyloxy)methyl]-butyrate] and trimethylolpropane diallyl ether.

In the examples of the practice of our invention that were included above, we employed about three parts by volume of polymer precursor materials per two parts by volume of the liquid crystal material. Of course, it will be recognized that the proportions of the matrix forming material and the liquid crystal material can be varied somewhat to produce the desired film product. The desired result is to obtain a dispersion of extremely finely divided droplets of the liquid crystal material throughout the polymer matrix. Solvents are not required and solvent separation is thus avoided.

In the practice of our invention, we mix the liquid materials together. At this stage it is not easy to tell how many liquid phases, if there are more than one, are present. However, the mixture can be cast as a film and allowed to stand as long as desired before the UV curing is initiated. After curing, the film may be examined, for example, by scanning electron microscopy (SEM), to determine the size of the droplets and the size range of the droplets of liquid crystal material dispersed in the polymer matrix. We prefer that the droplets be of a dimension or diameter of about 0.2 to 1 micron when the film is to be used for display or for the control of visible light. It may be desired to have slightly larger dispersed particles if the film is to be used for applications involving infrared radiation. The droplet size characteristics of the finished product may be correlated with the curing time or UV radiation intensity. The slower the cure, the larger the liquid crystal droplets.

Our films can be made easily and very rapidly—even in large area configurations. They have excellent light fastness and like aging resisting characteristics.

While our invention has been described in terms of a few specific examples, it will be appreciated that other forms could readily by adapted by one skilled in the art. Accordingly, the scope of our invention is to be considered limited only by the following claims.

The embodiments of the invention in which an exclusive property or privilege is claimed are defined as follows:

1. An optically responsive film comprising birefringent nematic and/or brirefringent chiral nematic liquid crystal microdroplets dispersed in a film of the ultraviolet radiation cured reaction product of a polyallyl compound and a polythiol taken from the group consisting of $Z[OCO(CH_2)_nSH]_m$, where $Z=$ a polyvalent organic moiety which is the $CH_{0-3}$ group containing nucleus of a tri- or tetravalent alcohol of the type of glycerol or pentaerythritol, $m=3$ or 4, and $n=1$ to 5, said microdroplets displaying positive dielectric anisotropy and/or positive diamagnetic anisotropy, said film being capable of undergoing repeated thermally and electrically or magnetically induced transitions between opaque and transparent.

2. An optically responsive film comprising birefringent nematic and/or birefringent chiral nematic liquid crystal microdroplets dispersed in a film of the ultraviolet radiation cured reaction product of triallyl isocyanurate and pentaerythritol tetakis(3-mercapto-propionate), said microdroplets displaying positive dielectric anisotropy and/or positive diamagnetic anisotropy, said film being capable of undergoing repeated thermally and electrically or magnetically induced transitions between opaque and transparent.

3. A method of making an optically responsive film containing microdroplets of a birefringent nematic and/or birefringent chiral nematic liquid crystal material dispersed in a polymer film comprising mixing a liquid crystal material with the UV-curable liquid precursor mixture comprising a polyallyl compound and a polythiol taken from the group consisting of $Z[OCO(CH_2)_nSH]_m$, where $Z=$ a polyvalent organic moiety which is the $CH_{0-3}$ group containing nucleus of a tri- or tetravalent alcohol of the type of glycerol or pentaerythritol, $m=3$ or 4, and $n=1$ to 5, and thereafter curing the mixture in the form of a film with high intensity ultraviolet radiation to thereby form a cured polymer matrix which is a reaction product of said allyl compound and polythiol containing dispersed therein droplets of liquid crystal material displaying positive dielectric anisotropy and/or positive diamagnetic anisotropy.

4. A method of making an optically responsive film containing microdroplets of a birefringent nematic and/or birefringent chiral nematic liquid crystal material dispersed in a polymer film comprising mixing a liquid crystal material with the UV-curable liquid precursor mixture comprising triallyl isocyanurate and pentaerythritol tetrakis(3-mercaptopropionate) and thereafter curing the mixture in the form of a film with high intensity ultraviolet radiation to thereby form a cured polymer matrix which is a reaction product of said precursors containing dispersed therein droplets of liquid crystal material displaying positive dielectric anistropy and/or positive diamagnetic anisotropy.

* * * * *